United States Patent
Kufner et al.

(10) Patent No.: US 10,422,247 B2
(45) Date of Patent: Sep. 24, 2019

(54) HOUSING STRUCTURE OF A TURBOMACHINE WITH HEAT PROTECTION SHIELD

(71) Applicant: MTU Aero Engines AG, Munich (DE)

(72) Inventors: Petra Kufner, Poing (DE); Walter Gieg, Eichenau (DE)

(73) Assignee: MTU Aero Engines AG, Munich (DE)

( * ) Notice: Subject to any disclaimer, the term of this patent is extended or adjusted under 35 U.S.C. 154(b) by 210 days.

(21) Appl. No.: 15/366,935

(22) Filed: Dec. 1, 2016

(65) Prior Publication Data

US 2017/0159492 A1 Jun. 8, 2017

(30) Foreign Application Priority Data

Dec. 7, 2015 (EP) ..................................... 15198252

(51) Int. Cl.
  *F01D 25/14* (2006.01)
  *F01D 11/12* (2006.01)
  *F01D 25/24* (2006.01)

(52) U.S. Cl.
  CPC .......... *F01D 25/145* (2013.01); *F01D 11/122* (2013.01); *F01D 25/246* (2013.01); *F05D 2220/32* (2013.01); *F05D 2240/11* (2013.01); *F05D 2240/15* (2013.01); *F05D 2260/231* (2013.01); *F05D 2260/30* (2013.01); *Y02T 50/675* (2013.01)

(58) Field of Classification Search
  CPC ...... F01D 25/145; F01D 9/041; F01D 11/003; F01D 11/10; F01D 11/122; F01D 25/246; F01D 25/14; F01D 25/26; F01D 11/08; F01D 11/12; F05D 2220/32; F05D 2240/11; F05D 2240/15; F05D 2260/231; F05D 2260/30
  USPC .............................. 415/173.1, 175, 177, 180
  See application file for complete search history.

(56) References Cited

U.S. PATENT DOCUMENTS

| 4,925,365 A | 5/1990 | Crozet et al. |
| 5,145,316 A | 9/1992 | Birch |

(Continued)

FOREIGN PATENT DOCUMENTS

| EP | 0618349 A1 | 10/1994 |
| EP | 2696037 A1 | 2/2014 |

(Continued)

*Primary Examiner* — Richard A Edgar
*Assistant Examiner* — Topaz L. Elliott
(74) *Attorney, Agent, or Firm* — Barlow, Josephs & Holmes, Ltd.

(57) ABSTRACT

The present invention relates to a turbomachine with a housing structure as well as a corresponding housing structure an outer housing wall and an inner housing wall, which, passing around the flow duct of the turbomachine at a distance from each other, surround the outer side of the flow duct, wherein the inner housing wall of the housing structure is formed by an OAS (outer air seal, outer fluid seal) in the region of the rotating blades of the turbomachine, which rotate around an axial axis of the turbomachine, wherein a heat protection shield is constructed between the outer housing wall and the OAS. The heat protection shield has a plurality of spacers in the peripheral direction that are distanced from one another in the peripheral direction and are situated additionally to and in the radial direction outside of the heat protection element.

10 Claims, 3 Drawing Sheets

(56) References Cited

U.S. PATENT DOCUMENTS

| | | | | |
|---|---|---|---|---|
| 5,192,185 | A | * 3/1993 | Leonard | F01D 11/08 |
| | | | | 415/170.1 |
| 6,302,642 | B1 | 10/2001 | Nagler et al. | |
| 2004/0213666 | A1* | 10/2004 | Gieg | F01D 11/127 |
| | | | | 415/170.1 |
| 2006/0038064 | A1 | 2/2006 | Mandet et al. | |
| 2010/0047062 | A1 | 2/2010 | Khanin et al. | |
| 2014/0044529 | A1* | 2/2014 | Feldmann | F01D 9/04 |
| | | | | 415/173.1 |
| 2016/0084099 | A1* | 3/2016 | Davis | F01D 11/003 |
| | | | | 415/173.1 |
| 2016/0305267 | A1* | 10/2016 | Clouse | F01D 11/127 |

FOREIGN PATENT DOCUMENTS

| | | |
|---|---|---|
| EP | 2719869 A1 | 4/2014 |
| EP | 2725203 A1 | 4/2014 |
| EP | 2728122 A1 | 5/2014 |
| WO | 2015084550 A1 | 6/2015 |
| WO | 2015089431 A1 | 6/2015 |
| WO | 2015102702 A2 | 7/2015 |
| WO | 2015138027 A2 | 9/2015 |

* cited by examiner

HOUSING STRUCTURE OF A TURBOMACHINE WITH HEAT PROTECTION SHIELD

BACKGROUND OF THE INVENTION

The present invention relates to a housing structure of a turbomachine and a corresponding turbomachine with such a housing structure in accordance with the present invention.

In turbomachines, such as stationary gas turbines or aircraft engines, the flow duct through which flows the fluid with which the turbomachine is operated, is delimited by a housing structure, which, on account of the conditions prevailing in the flow duct, has to meet diverse requirements. Because in part very high temperatures usually occur in the flow duct, the housing structure outwardly surrounding the flow duct has to ensure, in particular, that the temperature differences between the flow duct and the surroundings can be maintained, without the housing being heated too strongly on the outside. Accordingly, the housing structure usually has at least a two-shelled structure with an inner housing wall and an outer housing wall, which, on account of their different spacings from the flow duct, are subjected to temperature loads of different magnitude. In the gap between the outer housing wall and the inner housing wall, it is possible to provide thermally insulating elements and heat protection shields and the gap can also serve to carry a cooling fluid, such as cooling air. The design of the housing structure can be correspondingly complex.

Examples of housing structures of this kind are presented in U.S. Pat. No. 5,145,316 A or WO 2015/084550 A1. In the housing structure such as that shown in U.S. Pat. No. 5,145,316 A, however, there is a problem in that, owing to a direct attachment of the inner housing wall, which is in contact with the hot gas carried in the flow duct and is formed in the region of the rotating blades by a so-called outer fluid seal (outer air seal, OAS), to the outer housing wall, a strong thermal conduction into the outer housing wall takes place and a there is a high thermal output into the outer housing wall, so that the outer housing wall is subjected to a high temperature load.

In the housing structure of WO 2015/084550 A1, a heat protection shield is provided in the housing in the region of the rotating blades between the OAS of the inner housing wall and the outer housing wall and is arranged at a spacing from the OAS and from the outer housing wall. As a result of this, an additional shielding of the outer housing wall against the temperature load due to hot fluid in the flow duct can be achieved. However, the heat shielding is limited by the spaced arrangement of the heat protection shield from the OAS, and the design is complex, in particular for carrying cooling air, owing to the provision of a plurality of gaps in the radial direction between the OAS and the outer housing wall. Moreover, the heat protection shield is additionally mounted at the outer housing wall, so that, here, too, outward thermal conduction can occur.

SUMMARY OF THE INVENTION

The object of the present invention is therefore to provide an improvement of a housing structure of a turbomachine, in which the shielding of the heat present in the flow duct from outer housing wall regions is improved and, at the same time, the design of the housing wall structure shall be realized as simply as possible in order to ensure a simple and reliable operation of the turbomachine and simplify the assembly of the turbomachine.

This object is achieved by a housing structure as well as a turbomachine of the present invention. Advantageous embodiments are discussed in detail below.

The invention starts with the realization that the technical object posed above can be achieved by a heat protection shield, which, on the one hand, can be arranged in the form of an outer fluid seal (OAS) as close as possible to the inner housing wall, while, at the same time, an adequately dimensioned gap between the inner housing wall and an outer housing wall shall be provided for the arrangement of thermally insulating elements and for carrying cooling fluid. Moreover, the heat protection shield according to the invention shall assume additional functions in regard to the positioning of components of the housing wall structure in order to achieve a simple construction of a housing wall structure.

Accordingly, for a housing structure of a turbomachine that is arranged in the region of the rotating blades and has an outer housing wall and an inner housing wall, which surround the flow duct of the turbomachine on the outer side of the flow duct at a distance from each other, a heat protection shield between the outer housing wall and the inner housing wall, which is formed by an OAS, is provided, which additionally has, along with a flat heat protection element that rests against the OAS, a plurality of spacers that are distanced from one another in the peripheral direction around the flow duct and are arranged at the heat protection element so that they extend outward in the radial direction toward the outer housing wall in order to hold, in addition, a retaining ring of an adjacent guide vane segment in a form-fitting manner. As a result of the plurality of spacers distanced from one another in the peripheral direction, it is possible for the heat protection element to assume, in addition to heat shielding, the function of a positioning element for a retaining ring of an adjacent guide vane segment, without any impairment of the heat protection effect, because the flat heat protection element can be formed along the inner housing wall independently from the spacers. As a result of the additional retaining function of the heat protection shield, the design of the housing structure is simplified. Moreover, the spaced arrangement of a plurality of spacers in the peripheral direction and the thereby concomitant limitation of the spacers to a few regions of the circumference of the flow duct brings about a low heat conduction in the direction of the outer housing wall. At the same time, the local arrangement of the spacers in subregions of the circumference around the flow duct of the turbomachine and the arrangement of the heat protection shield at the OAS enables a nearly unhindered flow of a cooling fluid in the gap between the inner housing wall, that is, the OAS, and the outer housing wall to occur.

The heat protection shields of the housing structure according to the invention can be arranged in segments in the peripheral direction adjacent to one another in order to form an annular structure, so that the individual heat protection shields represent circular segments in the peripheral direction.

The heat protection shields have flat heat protection elements, which, besides their extension in the peripheral direction around the flow duct of the turbomachine, extend in the axial direction, so that, through the axial direction and the peripheral direction, a flat heat protection element is defined, the main surfaces of which extend through the axial direction and the peripheral direction.

The axial direction is defined in this case by the axial axis of rotation of the rotating blades of the turbomachine, around which the rotating blades rotate. Accordingly, the peripheral direction represents the direction going around the axial direction, whereas the radial direction is defined perpendicular to the axial direction.

The flat heat protection element of the heat protection shield thus comprises two opposite-lying main surfaces, which are defined by the axial direction and the peripheral direction, whereas the front sides of the flat heat protection element are defined by the radial direction and the peripheral direction or by the radial direction and the axial direction.

Provided on the flat heat protection shield in the radial direction are the plurality of spacers, in particular on the edge of the heat protection shield, for example, three to seven spacers per heat protection shield, which protrude from the heat protection element in the radial direction.

In their peripheral direction, the spacers are dimensioned in such a way that they take up only a portion of the heat protection shield in the peripheral direction of less than 30%, in particular less than 10%, and preferably less than 5%, of the length of the heat protection shield in the peripheral direction.

Radially distanced from the flat heat protection element, the spacers provide a support surface for a retaining ring of an adjacent guide vane segment, with the support surface extending both in the peripheral direction and in the axial direction.

In the axial extension of the support surface of the spacer, a curved section is provided on it, in which the support surface of the spacer runs in the direction of an adjacent guide vane segment and is curved in the direction of the heat protection element, so that it is possible to mount the heat protection shield in a simple manner.

The heat protection shield can rest with its flat heat protection element over the entire surface or at least up to 60%, preferably more than 75%, and, in particular, more than 90%, of the surface area of the heat protection element at the OAS or at a support structure of the OAS on which a sealing structure or a run-in coating is arranged or disposed. In this way, it is possible to achieve an especially good heat protection effect in the radial direction.

BRIEF DESCRIPTION OF THE DRAWING FIGURES

In a purely schematic way, in the attached drawings.

DESCRIPTION OF THE INVENTION

Further advantages, characteristics, and features of the present invention will become clear in the following detailed description of exemplary embodiments. However, the invention is not limited to these exemplary embodiments.

Figure 1:
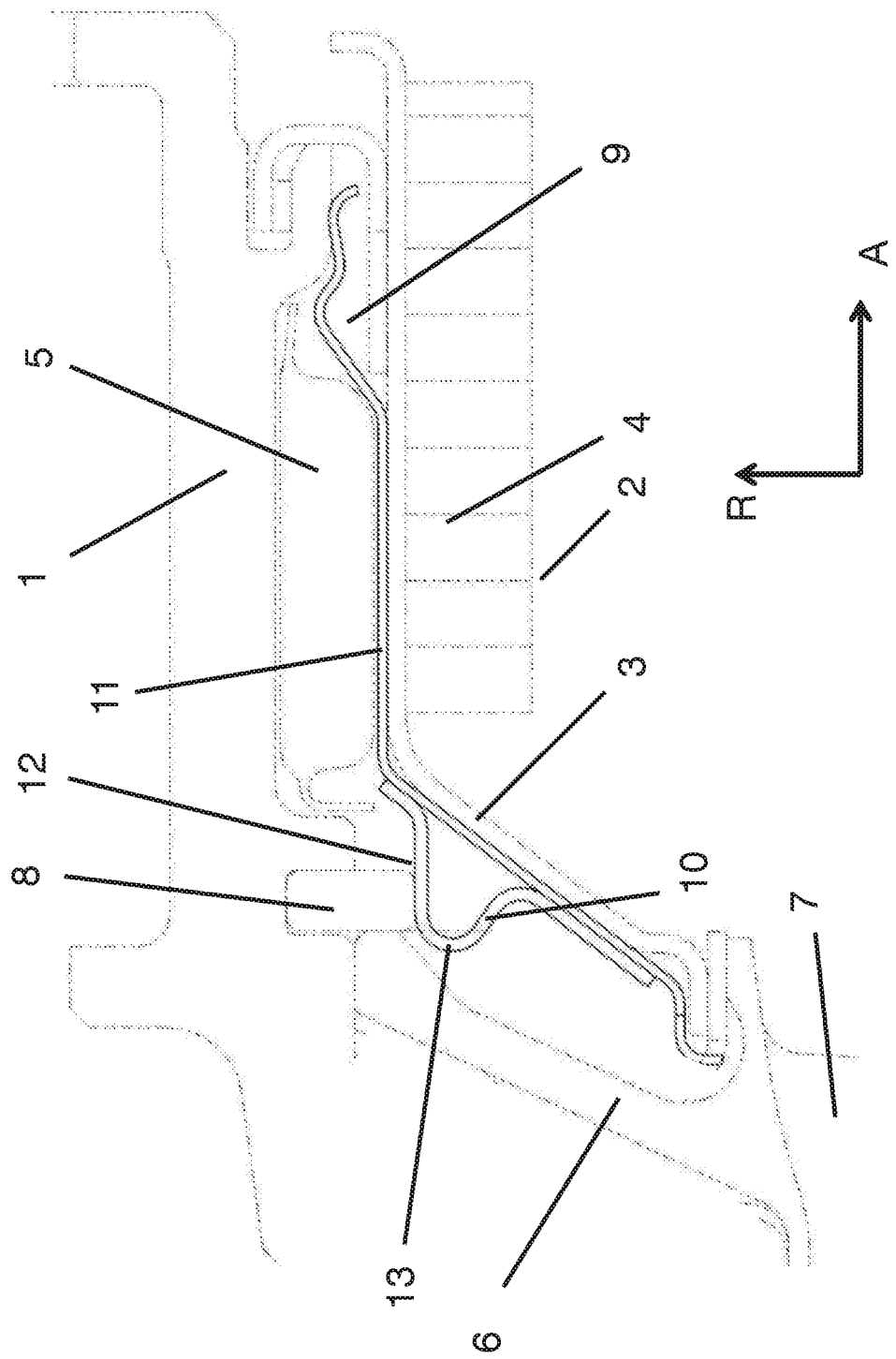
FIG. 1 shows a partial sectional illustration through an outer housing structure of a turbomachine with the sectional plane parallel to the axial direction of the turbomachine according to the present invention.

FIG. 1 shows a sectional illustration of a portion of an outer housing structure of an aircraft engine, in which the axial direction A and the radial direction R are indicated by respective arrows. The axial direction A is defined by the axis of rotation around which the rotating blades (not shown) of the turbomachine rotate. In order to minimize the flow loss between the ends of the rotating blade and the housing structure surrounding the flow duct, the tips of the rotating blades are able to sweep over a sealing structure 4, the so-called run-in coating, which is a part of the outer fluid seal (outer air seal, OAS) 2, which is made up of a seal support 3 and the sealing structure 4 or the run-in coating.

The OAS 2 forms the inner wall of the outer housing structure surrounding the flow duct, while the outer housing structure is terminated outward by an outer wall 1. Provided between the outer wall 1 and the OAS 2 is a gap, in which various components, such as a heat protection shield 9, a thermally insulating element 5, and the like, are arranged, with, at the same time, the gap between the outer wall 1 and the OAS 2 also finding use for the flow of cooling air passing through it in order to realize the high temperature difference between the fluids carried in the flow duct and the outer surroundings.

Arranged in the axial direction A adjacent to the OAS 2 is a guide vane segment 6 with guide vanes 7, which is held in the axial direction A by a retaining ring 8.

As ensues from the illustration of FIG. 1, the heat protection shield 9 according to the invention extends in the axial direction A nearly over the entire axial extension of the OAS 2 and, in large portions, rests directly against the entire surface of the OAS 2 or its seal support 3. Only at the axial ends of the heat protection shield 9 is it constructed such that it is arranged in a few regions at a distance from the OAS 2 or its seal support 3 in order, for example, to grasp other components or engage in them, so as to be fixed in place by them. The heat protection shield 9 can thus effectively adjust a temperature gradient, which brings about a clear drop in temperature from the OAS 2 in the direction of the outer housing wall 1 and thus essentially in the radial direction R.

At the same time, the heat protection shield 9 according to the invention can be held on the OAS 2 in a simple way and hold the retaining ring 8 in the radial position in a form-fitting manner, because the plurality of spacers 10 are arranged at a distance from one another in the peripheral direction. The heat protection shield 9 according to the invention in the embodiment according to FIG. 1 thus comprises a flat heat protection element 11 as well as a plurality of spacers 10 arranged at a distance in the peripheral direction, these spacers extending outward from the flat heat protection element 11 in the radial direction R toward the outer housing wall 1 and provide a support surface 12 on which a retaining ring 8 of the adjacent guide vane segment 6 can rest. Because the spacers 10 are additionally arranged in a radial direction R with respect to the flat heat protection element 11 and above this element and have only a limited extension in the peripheral direction around the axial axis of rotation of the rotating blades, said extension corresponding to a fraction of the extension of the heat protection shield 9 or of the flat heat protection element 11 in the peripheral direction, it can be ensured that, as a result of the spacers 10, no excess heat conduction in the direction of the outer housing wall 1 can take place and, in addition, an adequate gap between the outer housing wall 1 and the OAS 2 is present and can be utilized for the flow of cooling fluid. As a result, a multifunctional heat protection element 9 is obtained, which brings about the effective shielding of the outer housing wall 1 against the heat prevailing in the flow duct and, at the same time, enables the radial positioning of the retaining ring 8, without impairing either the heat protection function in regard to heat transmission or the local extension of the heat protection shield 9.

Figure 2:
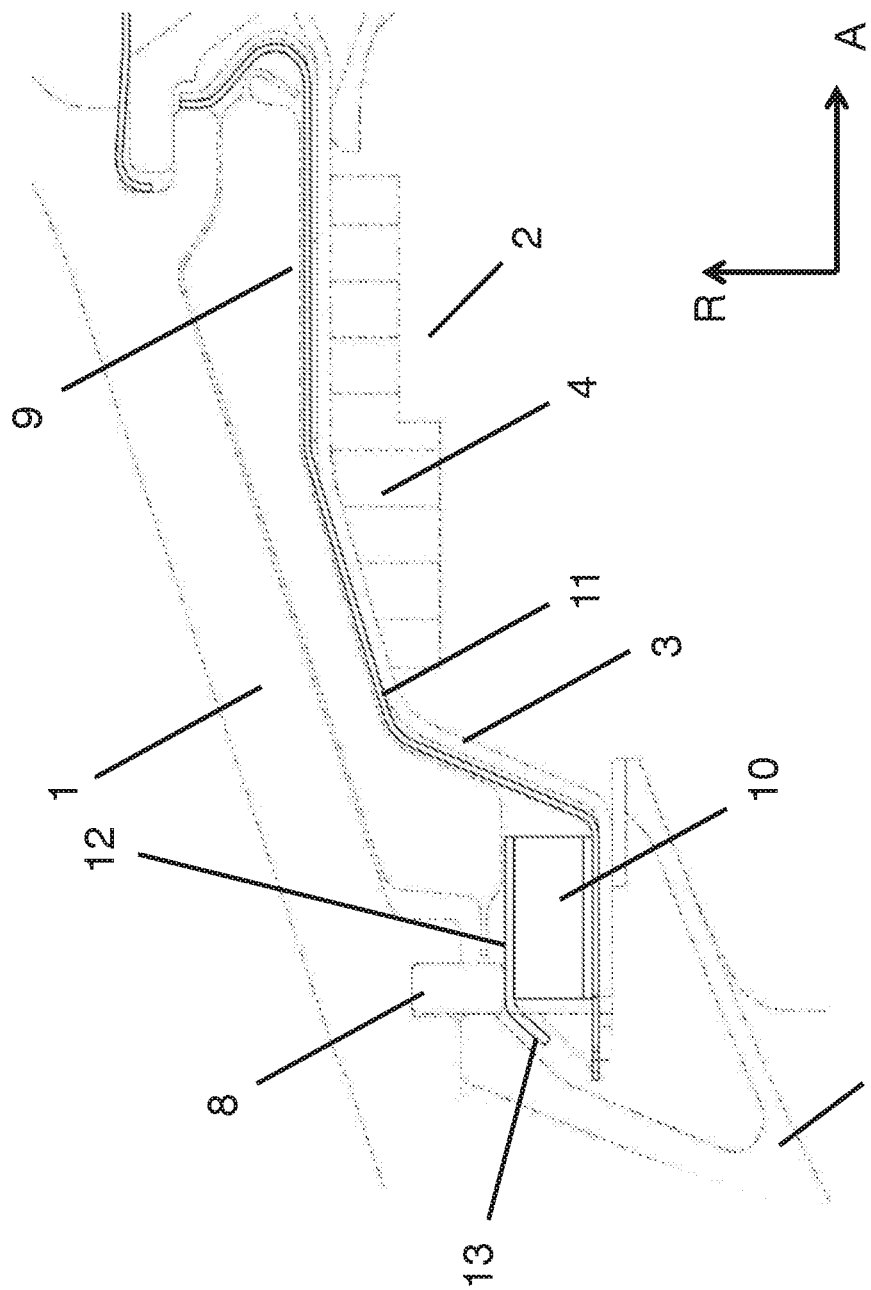
FIG. 2 shows another example of a housing structure according to the invention in an illustration similar to that of FIG. 1.

FIG. 2 shows a second embodiment of a heat protection shield 9 according to the invention, in which, for this second embodiment in FIG. 2, identical or similar components are provided with the same reference numbers.

In accordance with FIG. 2, the heat protection shield 9 according to the invention also has in this embodiment a flat heat protection element 11 as well as a plurality of spacers 10 distributed in the peripheral direction and arranged at a distance from one another, which extend from the flat heat protection element 11 in the radial direction R. It can also be seen in this embodiment that the heat protection shield 9 rests with its flat heat protection element 11 nearly over the entire surface of the seal support 3 of the OAS 2. In this exemplary embodiment, the spacers 10 also provide a support surface 12 on which the retaining ring 8 of the guide vane segment 6 rests. The spacers 10 of the embodiment of FIG. 2 also have a curved section 13 extending in the axial direction, for which the curve of the support surface 12 occurs in a direction that is radially inward toward the flow duct in order to enable a simple retraction of the heat protection shield 9 beneath the retaining ring 8.

Figure 3:
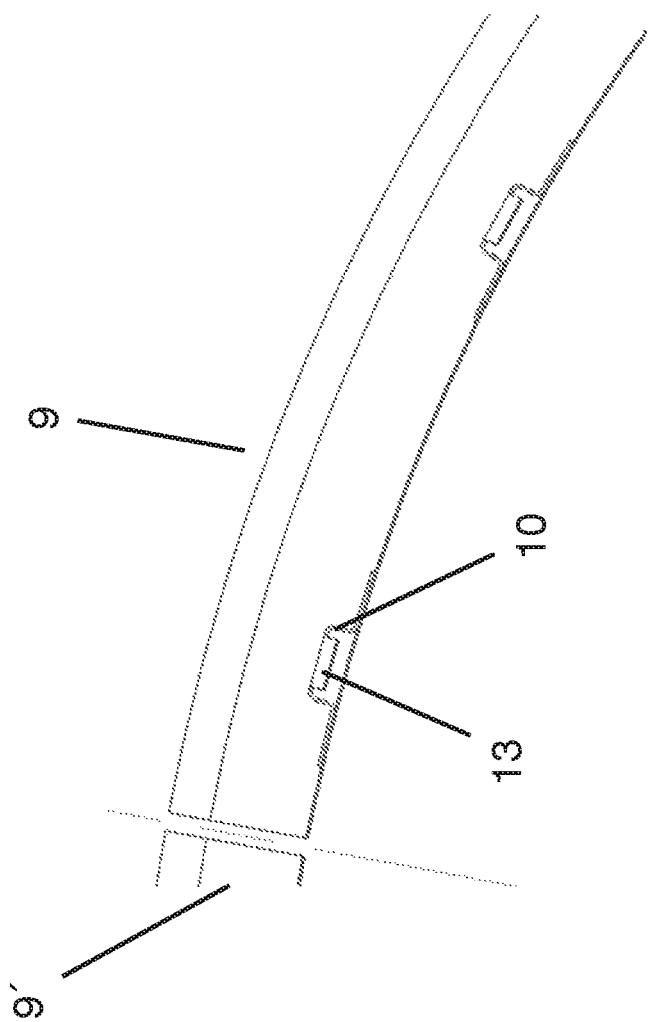
FIG. 3 shows an axial plan view of a heat protection shield according to the invention, such as shown in FIG. 2.

FIG. 3 shows two adjacent heat protection shields 9, 9' in a partial axial plan view, that is, with the axial direction perpendicular to the plane of the figure. It can be seen from FIG. 3 that the heat protection shield can be designed as segments, which, arranged adjacent to one another in the peripheral direction, represent a border around the entire circumference of the flow duct. Thus, in the peripheral direction, the heat protection shields 9, 9' represent circular segments. In the illustration of FIG. 3, it can also readily be seen that the spacer elements 10 are arranged at a distance from one another in the peripheral direction around the flow duct and are provided only in a fraction of the circumference, with respect to the circumference.

Although the present invention has been described in detail on the basis of exemplary embodiments, it is obvious to the person skilled in the art that the invention is not limited to these exemplary embodiments, but rather that modifications are possible in such a way that individual features can be omitted and other kinds of combinations of features can be realized, as long as there is no departure from the protective scope of the attached claims. The disclosure of the invention includes all combinations of the individual features presented.

What is claimed is:

1. A housing structure of a turbomachine comprising an outer housing wall and an inner housing wall, which, passing around a flow duct of the turbomachine at a distance from each other, surround an outer side of the flow duct, with the inner housing well of the housing structure being formed by an outer fluid seal in a region of rotating blades of the turbomachine, which rotate around an axial axis of the turbomachine, with a heat protection shield being constructed between the outer housing wall and the outer fluid seal and resting against the outer fluid seal and comprising a flat heat protection element, and with a guide vane segment being arranged on the inner housing wail adjacent to the outer fluid seal in an axial direction parallel to the axial axis and being retained in place in its axial position by a retaining ring, which is releasably arranged in the outer housing wall, wherein the heat protection shield in a peripheral direction has a plurality of spacers that are distanced from one another in the peripheral direction and are situated additionally to and in a radial direction outside of the heat protection element and bridge a distance between the retaining ring and the heat protection element, wherein the spacers provide a support surface on which the retaining ring can rest, wherein the outer fluid seal includes a support and a seal, the support being disposed between the seal and the heat protection shield and wherein the heat protection shield is spaced a radial distance away from the seal at least at an axially downstream location to engage securing elements of the outer housing wall.

2. The housing structure according to claim 1, further comprising a plurality of the heat protection shields arranged in segments adjacent to one another in the peripheral direction to form an annular structure.

3. The housing structure according to claim 1, wherein the heat protection shield extends in the axial direction, with the spacers being arranged on an edge of the heat protection shield.

4. The housing structure according to claim 1, wherein the flat heat protection element extends in the axial direction and in the peripheral direction around the flow duct and defines a main surface in the axial direction and peripheral direction, with the spacer elements being arranged on the main surface.

5. The housing structure according to claim 1, wherein the plurality of spacers is 3 to 7 spacers that are arranged per heat protection shield.

6. The housing structure according to claim 1, wherein, in the peripheral direction, the plurality of spacers take up a portion of the heat protection shield that is less than 30% of a length of the heat protection shield.

7. The housing structure according to claim 1, wherein the support surface extends in the axial direction at a distance from the heat protection element, wherein, in an extension of the support surface a curved section is provided.

8. The housing structure according to claim 1, wherein the heat protection shield rests over a portion of a surface of the outer fluid seal selected from the group consisting of the entire surface, at least up to 60%, more than 75% and more than 90%.

9. The housing structure according to claim 1, wherein the housing structure is configured and arranged in a turbomachine.

10. The housing structure according to claim 1, wherein the spacers are disposed axially upstream of the axially downstream location where the heat protection shield is spaced the radial distance away from the seal.

* * * * *